Apr. 10, 1923.  
W. J. HUNT  
TIRE CARRIER LOCK  
Filed May 27, 1921  
1,451,615  
2 sheets-sheet 1

Inventor  
W. J. Hunt.  
By Geo. P. Kimmel.  
Attorney

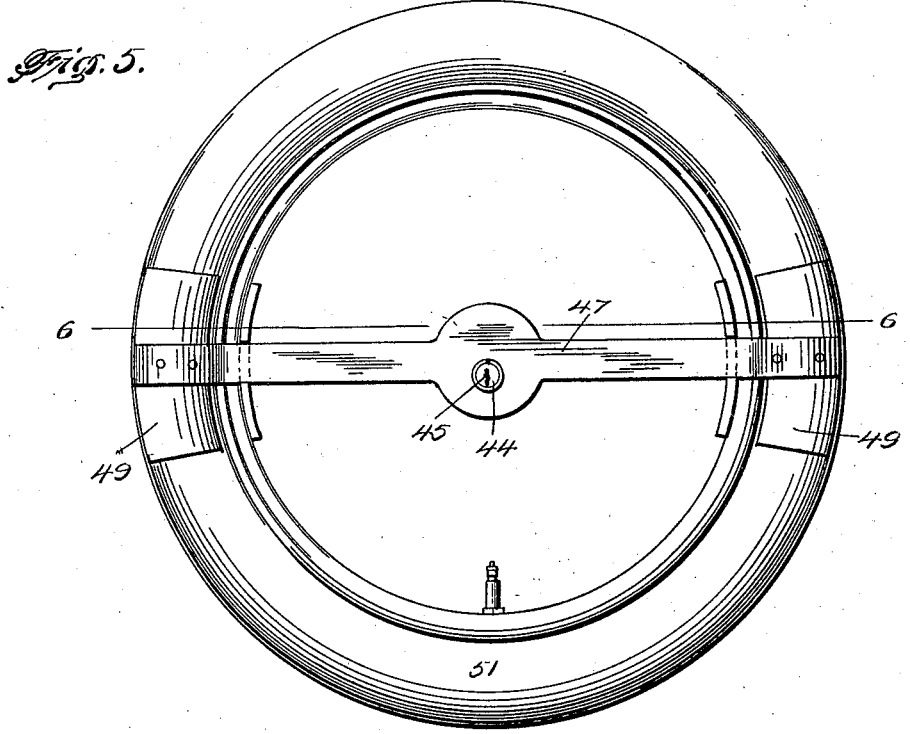
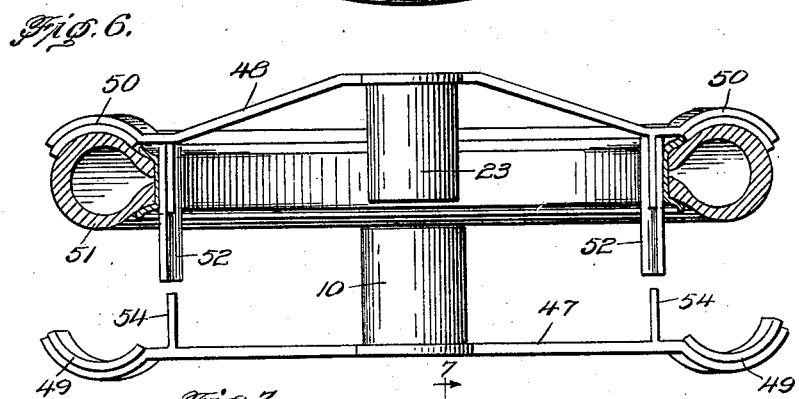
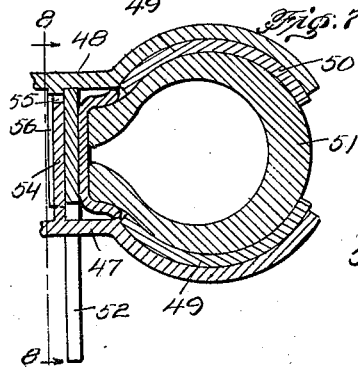
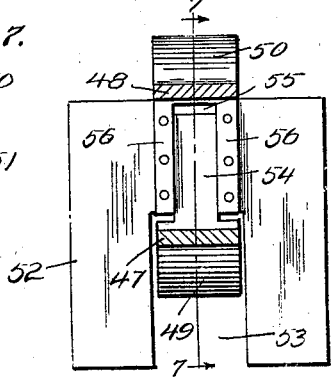

Patented Apr. 10, 1923.

1,451,615

UNITED STATES PATENT OFFICE.

WILLIAM J. HUNT, OF ST. JOSEPH, MISSOURI.

TIRE-CARRIER LOCK.

Application filed May 27, 1921. Serial No. 472,998.

*To all whom it may concern:*

Be it known that I, WILLIAM J. HUNT, a citizen of the United States, residing at St. Joseph, in the county of Buchanan and State of Missouri, have invented certain new and useful Improvements in Tire-Carrier Locks, of which the following is a specification.

This invention appertains to improvements in locking devices or mechanisms generally, and more particularly to a type of the same adapted for use in connection with spare tire carrier brackets for automobiles for the prevention of the theft of spare tires therefrom.

The principal object of the invention is to provide for a locking device or mechanism of the class mentioned, and one particularly designed for use in the locking of adjustable bracket sections between which either one or more tires may be readily clamped in position, and otherwise securely locked against accidental or unauthorized removal.

With the foregoing and other objects in view, the invention resides in the certain novel and useful construction and arrangement of parts as will be hereinafter more fully described, set forth in the appended claims, and illustrated in the accompanying drawings, in which:—

Figure 1:
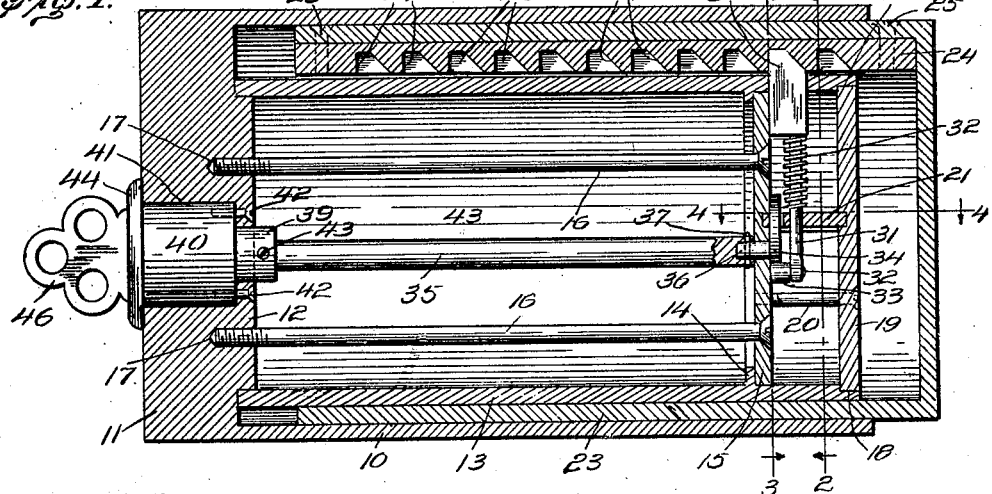
Figure 2:
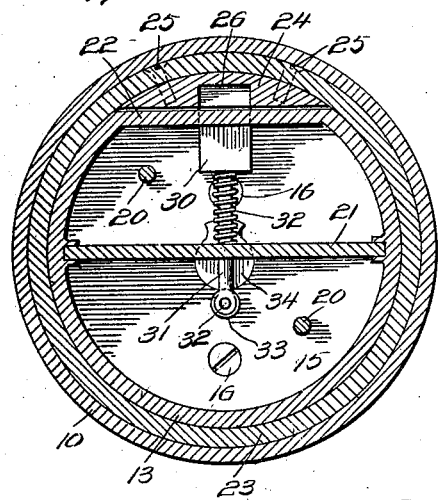
Figure 3:
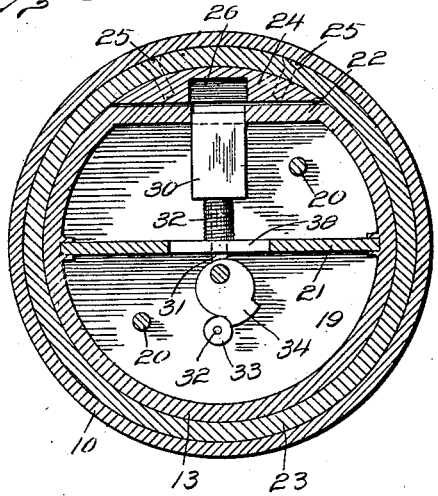
Figure 4:
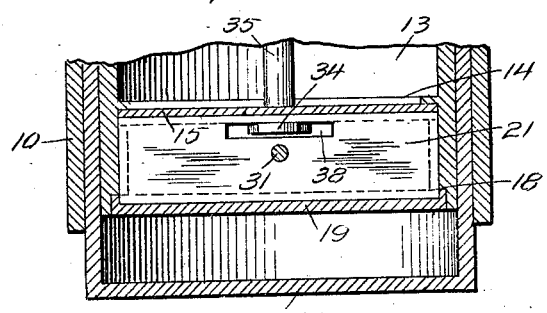

Figure 1 is a longitudinal section taken through the preferred embodiment of the locking device or mechanism, Fig. 2 is a transverse section taken on the line 2—2 of Fig. 1, Fig. 3 is a section similar to Fig. 2, but taken on the line 3—3 of Fig. 1, Fig. 4 is a fragmentary sectional detail taken on the line 4—4 of Fig. 1, Fig. 5 is a front elevation of a form of tire carrier brackets showing a tire or tires secured within the same, Fig. 6 is a horizontal section taken on the line 6—6 of Fig. 5, Fig. 7 is an enlarged fragmentary sectional detail taken on the line 7—7 of Fig. 8, and, Fig. 8 is a sectional detail taken on the line 8—8 of Fig. 7.

Referring to the drawing, wherein similar characters of reference designate corresponding parts in the several views thereof, the numeral 10 indicates an outer casing section, preferably of cylindrical form, having a concentric bore extending inwardly from one end thereof, and of a depth to provide a relatively thick end wall portion 11, the inner face of which end wall 11 is formed to provide a thickened central portion 12 disposed concentrically of the bore. Disposed concentrically of the bore of the outer casing section 10 is a cylindrical sleeve 13, which is of a diameter to have its inner end portion snugly engaged over the thickened end wall portion 12, and is formed inwardly of its outer end with an annular flange 14 for the seating on the outer face thereof of a securing disk 15. The sleeve 13 is secured in position by means of a set of screws 16, which are passed inwardly of openings formed in the securing plate or disk 15, and have their inner threaded ends engaged in complementally threaded openings or sockets 17 formed inwardly of the centrally thick portion 12 of the end wall 11. The outer free end of the sleeve 13 is formed to provide an inwardly disposed annular groove or shoulder portion 18, for the reception of a closure plate or disk 19, which is secured in position by means of a set of screws 20 extending inwardly of openings formed in the same and have their inner threaded ends engaged in complementally threaded openings formed in the securing plate 15. Extending transversely of the compartment formed between the securing plate or disk 15 and the end closure plate or disk 19, is a partition plate 21, which is preferably mortised at its opposite side and end edges in complementally formed grooves in the opposed faces of the sleeve 13 and said plates or disks 15 and 19, substantially as shown in Figs. 1, 2 and 3.

The sleeve 13 is preferably flattened, as at 22, in a longitudinal direction at one side of the same, and the thickened central portion 12, of the end wall 11 of the outer casing member 10, is correspondingly flattened to conform thereto for its snug engagement within the inner end of the sleeve as hereinbefore stated, and adapted to be telescopically engaged within the outer casing 10 and between the inner wall of the bore thereof and the opposed wall of the sleeve 13, is an inner lock casing 23, which comprises a hollow cylindrical body closed at its outer end. Extending longitudinally inward of the inner casing 23 is a latch or lock keeper bar or member 24, which has its outer side wall curved in a transverse direction throughout its length to conform to the curvature of the inner wall of the casing section 23, and is secured in position thereon by means of screws 25, the inner wall of the keeper bar or member being flat to correspond to the opposed flat face of the portion 22 of the sleeve 13.

Formed inwardly of the longitudinal center of the flat inner face of the keeper bar or member 24, are a series of latch engaging openings or sockets 26, which are formed with forwardly disposed flat vertical walls 27 and rearwardly disposed inclined walls 28 substantially as shown in Fig. 1. Projecting outwardly of the flat portion 22 of the sleeve 13, is a latch bolt or member 30, which has its active outer end shaped to conform to that of the openings or sockets 26, of the keeper bar or member 24, and to snugly engage therein when operated. The latch bolt or member 30 is carried on one end of a rod 31 which is slidably mounted in an opening formed in the partition plate 21, and carried on the rod 31 is a coiled spring 32, which is interposed between the inner end of the latch bolt or member 30 at the opposed face of the partition plate 21, so as to normally tension the bolt or member 30 in operative position outwardly of the sleeve 13, and into the path of the keeper bar or member 24. The inner end of the rod 31 is formed to provide a bearing opening in which is journaled the supporting pin or pintle 32 of a roller 33, which is disposed in the path of a cam member 34 carried on the inner adjacent end of a lock actuated rod 35, the cam member 34 being provided with a pintle 36, which is journaled through the securing plate or disk 15, and extends into engagement with a socket opening formed in the inner end of the rod 35 for the purpose, a cotter pin 37, or the like, being passed transversely through the rod 35 and pintle 36 for securing the same together. The cam member 34 is operable in a slotted opening 38 formed in the partition plate 21, and is movable against the roller 33 in a manner to draw the latch bolt 30 inwardly of the flat wall 22, of the sleeve 13, out of engagement with a complemental keeper socket 26, whereby to admit of the withdrawal of the inner casing section 23 from the outer casing section 10, or vice versa, or the adjustment thereof one with respect to the other, in one direction of turning movement of the actuating rod 35, and to release the roller 33 for the expanding action of the spring 32 for the reengagement of the latch bolt 30 with the keeper socket 26 of the keeper bar or member 24. The rod 35 extends longitudinally inward of the sleeve 13, and has its outer end engaged in a sleeve or socket 39 of a locking device. This locking device is preferably in the form of a cylinder lock, of well known construction, and consists of a cylindrical body or casing 40 containing the locking mechanism, which is to be snugly fitted in an outwardly opening socket or bore 41 formed in the outer end face of the closed end portion 11, of the outer casing section 10, and which is secured in position by means of screws 42 threaded into engagement therewith from the inner face of the inner wall portion 11, substantially as is shown in Fig. 1. Projecting inwardly of the inner ends of the locking body or casing 40 is the sleeve or socket portion 39 thereof, which is secured to the connected end of the rod 35 by means of a screw 43. The locking body or casing 40 is preferably formed with an outer face plate 44 bearing against the outer face of the end wall 11, of the outer casing section 10, and this plate is provided with a suitable slotted opening 45 for the insertion therein of a key 46, whereby the locking mechanism within the lock body or casing 39, is properly manipulated for the turning movements of the rod 35 to and from locked position.

In the application of the locking device as a whole to a spare tire carrier bracket for automobiles, and as shown in Figs. 5 and 8, inclusive, the outer casing section 10 is secured in position, in any desired or suitable manner as by brazing or the like, to one section 47 of the bracket, and the other or inner casing section 23 thereof to the bracket section 48. In the tire bracket shown, the opposite ends of the bracket sections 47 and 48 are provided with complemental pairs of tire clamp shoes 49 and 50, respectively, between which are adapted to be positioned, one or more tires 51. The bracket section 48 is preferably fixed in position on an automobile, and the bracket 47 is separable therefrom, and after the tire or tires 51 have been positioned between the same, the outer separable section 47 is moved inwardly toward the fixed section 48, and the casing section 10 telescopically engaged over the casing section 43. Upon the further inward movement of the outer casing section 10, on the inner casing section 23, the latch bolt 30 is to be released for movement into engagement with a registering keeper socket 26, it being understood that the key 46 has been inserted into the key slot 45 and manipulated within the lock casing 40 whereby to turn the rod 35 for the moving of the cam member 34 to the position of the same as shown in Fig. 3, whereby to engage the roller 33 for retaining the latch member 30 retracted against the tension of the spring 32. When the tire or tires have been tightly clamped in position as indicated, the latch bolt 30 is to be moved into engagement with the registering keeper slot 26 by the expanding action of the coiled spring 32, when the latch member 30 is released for the purpose, such release of the latch member being effected by the turning movement of the key 46, together with the rod 35 to move the cam 34 to the position of the same as shown in Fig. 2. In the latter position of the cam member 34, the latch bolt 30, and the rod 31 carrying the same, will be free for movement under the tension of the spring 32, but will resist all efforts for the separation of the parts of the bracket, or of the casing sections one from the other, for the removal of a tire from between the clamps used, 49 and 50, by reason of the flat straight faces of the same engaging with the vertical flat faces of the keeper socket 26. However, in this position, if it is desired to tighten the parts of the bracket together, inward movement of the outer bracket member 47 will cause the further telescoping of the lock casing 10 onto the inner casing section 23, and the latch bolt 30 will ride over the inclined face of its engaged keeper socket 26 and into the next succeeding keeper socket or sockets. When it is desired to remove a tire from a bracket, the key 46 will be inserted into the key slot 45, and the rod 35 turned to move the cam 34 on the roller 33, in a manner to force the latter downwardly, whereby the latch bolt 30 will be retracted and the spring 32 compressed as shown in Fig. 3.

To prevent the attempted unauthorized removal of a tire, as by deflating the same, the bracket arm 48 is provided with a pair of outwardly extending plates 52, one disposed immediately inwardly of each of the tire shoes 50, whereby the inner periphery of the tire or tires will contact the same, and these plates 52 are bifurcated, as at 53, to admit of the insertion into such bifurcations 53 of the separable bracket member 47, the latter member being provided with laterally extending arms 54 adapted for engagement with slotways 55 formed between pairs of spaced metal strips or bars 56 carried on the inner faces of the plates 52 for such purpose.

It is well understood that, while the locking device has been described and illustrated herein in specific terms and details of construction and arrangement, various changes in and modifications of the same, or of the parts thereof, may be resorted to without departing from the spirit of the invention, or the scope of the claims appended hereto.

Having thus fully described the invention, what is claimed, is:—

1. In a locking device as characterized, a pair of cylindrical casings adapted for telescopic engagement with each other, a keeper device within the inner of said casings and coextensive therewith and having a plurality of keeper sockets spaced along the same, a latch bolt carried by the outer of said casings and adapted for selective engagement with the said keeper sockets, an actuating mechanism carried by the outer of said casings for said latch bolts, and means, carried by the outer of said casings for locking said actuating mechanism and said latch bolt in its inoperative position.

2. In a locking device as characterized, an outer casing section and an inner casing section adapted for telescopic engagement one with the other, a keeper member carried within the inner of said casing sections and coextensive therewith and having a plurality of keeper sockets spaced along the same, a sleeve disposed concentrically within the outer of said casing sections provided with means to form a clearance for said keeper member, a latch bolt carried by said sleeve, an actuating means for said latch bolt carried by the outer of said casing sections and said sleeve and within the latter, and means for locking said actuating mechanism and said latch member in their inoperative positions.

3. In a locking device as characterized, an outer casing section and an inner casing section adapted for telescopic engagement one with the other, a keeper member carried within the inner of said casing sections and coextensive therewith and having a plurality of keeper sockets spaced along the same, a sleeve carried by and disposed concentrically within the outer of said casing sections and having means to provide a clearance for said keeper member, a latch bolt supported by said sleeve, spring means normally holding said latch bolt in its operative position, an actuating means for said latch bolt carried by the outer of said casing sections and said sleeve and arranged within the latter, and means for locking said actuating mechanism and said latch members in their inoperative positions.

4. In a locking device as characterized, an outer casing section and an inner casing section adapted for telescopic engagement one with the other, a keeper member carried within the inner of said casing sections and coextensive therewith and having a plurality of keeper sockets spaced along the same, a sleeve disposed concentrically within the outer of said casing sections and overlapped by the inner of said casing sections, a latch bolt carried by said sleeve, spring means normally holding said latch bolt in its operative position, a cam member for moving said latch bolt to inoperative position against the tension of said spring, an actuating rod for manipulating said cam member supported from the outer of said casing sections and by said sleeve, and means carried by the outer of said casing sections and connected to said actuating rod, for locking said rod to retain said latch bolt in its inoperative position.

In testimony whereof, I affix my signature hereto.

WILLIAM J. HUNT.